United States Patent [19]

Tanaka

[11] Patent Number: 5,779,360
[45] Date of Patent: Jul. 14, 1998

[54] AGITATION APPARATUS INCLUDING VESSEL HAVING MIXING BLADES AND MOVEABLE AGITATOR

[75] Inventor: Masaru Tanaka, Chiba-ken, Japan

[73] Assignee: Katsu Manufacturing Co., Ltd., Chiba-ken, Japan

[21] Appl. No.: 716,644

[22] Filed: Sep. 16, 1996

[30] Foreign Application Priority Data

Dec. 20, 1995 [JP] Japan .................. 7-354555

[51] Int. Cl.$^6$ ................................. B01F 7/18
[52] U.S. Cl. ............... 366/286; 366/305; 366/306; 366/307; 366/325.94
[58] Field of Search ............... 366/64–66, 96–98, 366/261, 285–286, 289, 305–307, 197, 207, 325.4, 325.92, 325.94

[56] References Cited

U.S. PATENT DOCUMENTS

| 1,916,042 | 6/1933 | Edgar | 366/285 X |
|---|---|---|---|
| 2,157,683 | 5/1939 | Vollrath | 366/98 |
| 2,577,802 | 12/1951 | Payne | 366/305 |
| 2,637,330 | 5/1953 | Webster | 366/285 X |
| 4,042,221 | 8/1977 | Myers et al. | 366/207 X |
| 4,107,789 | 8/1978 | McDowell | 366/65 X |
| 4,798,471 | 1/1989 | Laempe | 366/65 |
| 4,898,474 | 2/1990 | Lipson | 366/207 X |
| 5,383,726 | 1/1995 | Lanaro | 366/286 X |

FOREIGN PATENT DOCUMENTS

| 2029641 | 5/1972 | Germany | 366/285 |
|---|---|---|---|
| 3706002 | 9/1987 | Germany | 366/65 |

*Primary Examiner*—Charles E. Cooley
*Attorney, Agent, or Firm*—Wenderoth, Lind & Ponack

[57] ABSTRACT

An agitator apparatus for agitating pellets of raw material of synthetic resins includes an agitation vessel for receiving pellets and coloring agents and removably housed in a supporting frame. An agitator is mounted elevatably on the supporting frame for entering into and withdrawing from the vessel. The agitator has a plurality of agitating legs and agitating blades which are mounted to respective lower ends of the agitating legs. The agitation vessel is provided in the center bottom thereof with an upright guiding pillar to which a stationary blade is fixed and is provided in the inner peripheral wall thereof with a plurality of mixing blades for agitating the pellets together with coloring agents in the agitation vessel to accomplish uniform coloring of the pellets.

6 Claims, 2 Drawing Sheets

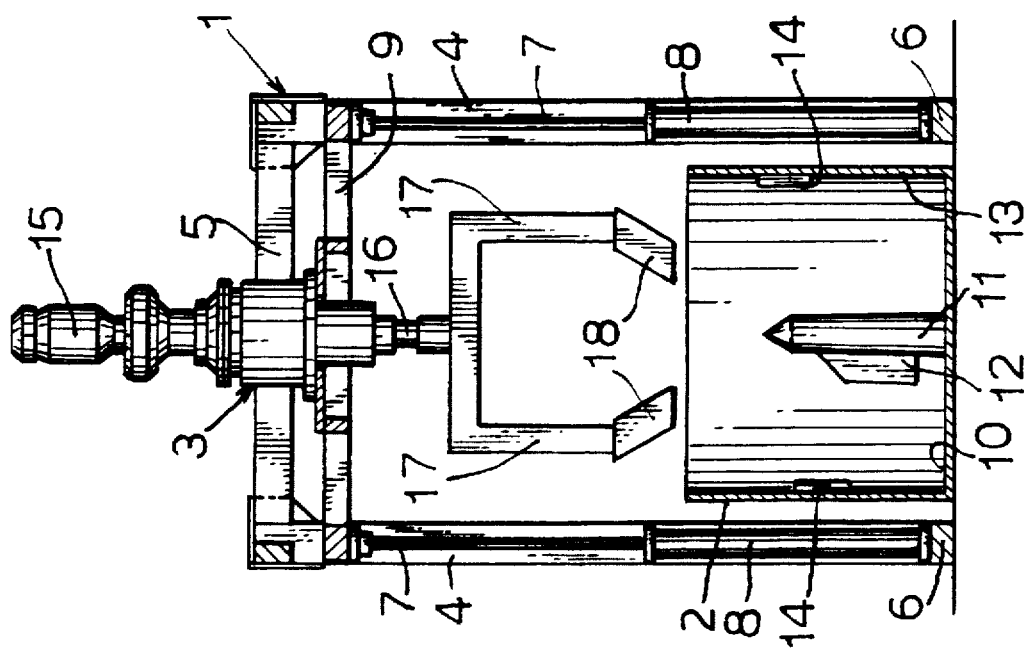
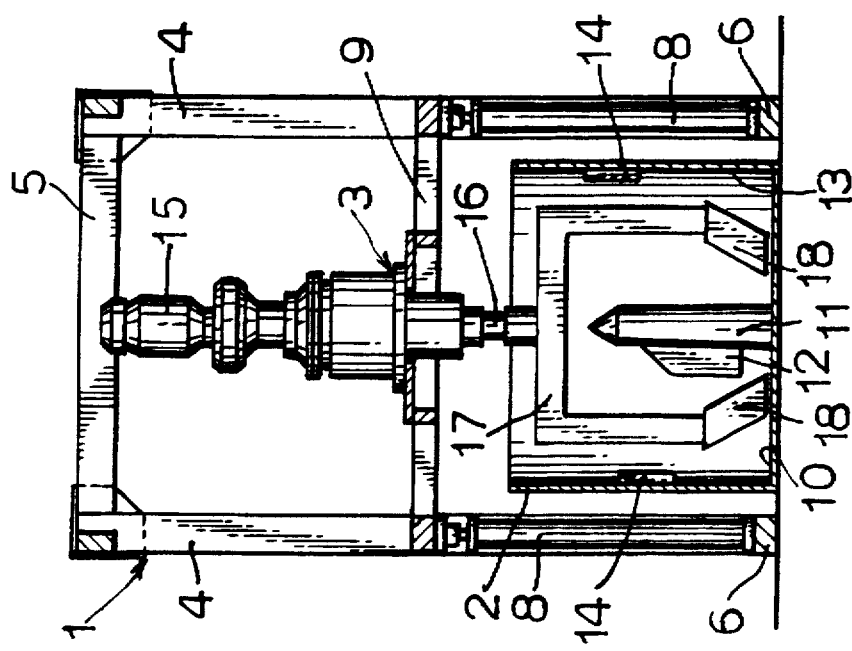

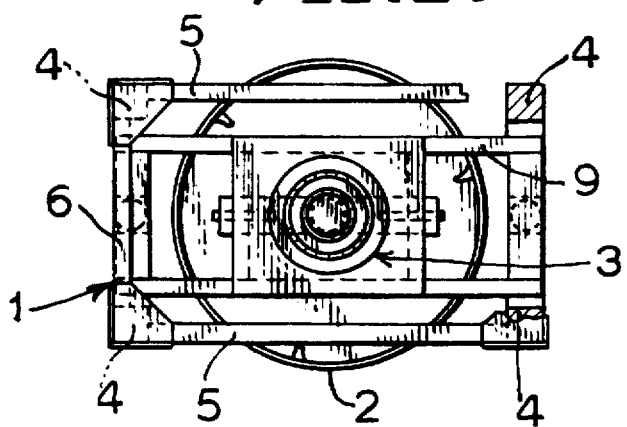
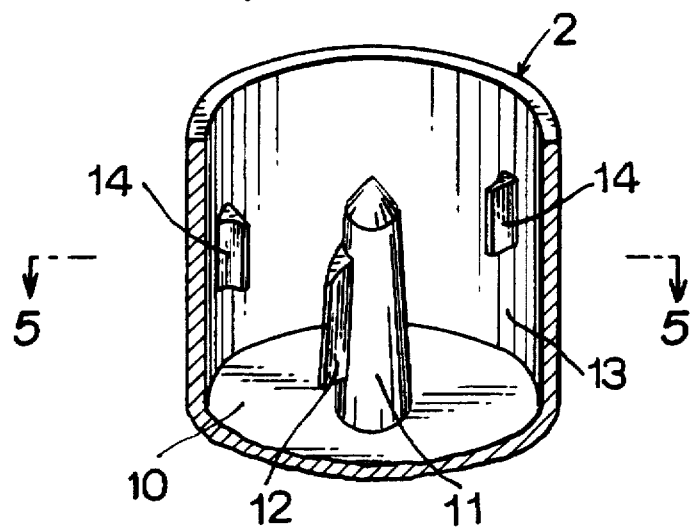
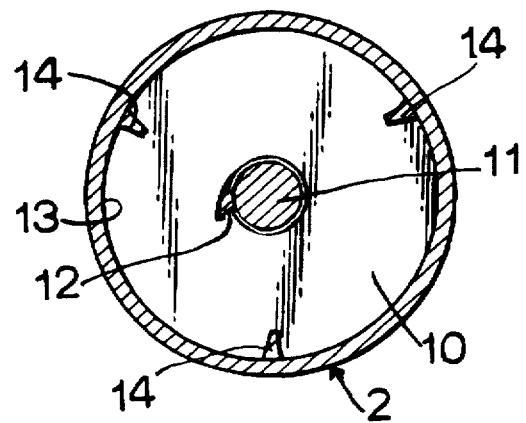

AGITATION APPARATUS INCLUDING VESSEL HAVING MIXING BLADES AND MOVEABLE AGITATOR

FIELD OF THE INVENTION:

This invention relates to an agitation apparatus for uniformly mixing and coloring pellets of raw materials of synthetic resins to be supplied to an extrusion machine. Description of the Prior Art:

The known agitation apparatus of this type includes a rotary agitator having a rotating shaft fixed at its center position. The rotary agitator is provided with a closing lid on its upper end for pouring pellets an with a discharging port at its lower end. Both ends of the rotating shaft are supported rotatably by a column. A pulley is fixed to one end extended to the outside of the column and another pulley is also fixed on the shaft of a electric motor disposed at the lower end of the column. Both pulleys are connected by a belt. Therefore, the pulleys are driven by the motor, and the rotary agitator is rotated by the center rotating shaft to which the pulleys are fixed, thereby to mix and color pellets.

In such known agitation apparatus, the agitating condition of the pellets cannot be observed from the outside of the agitation apparatus itself. The rotary agitator, into which the pellets were poured from the closing lid provided on the upper end thereof, is rotated to mix and color the pellets. On the other hand, it takes a long time for mixing and coloring operation to achieve thorough and uniform coloring of the pellets, because the pellets in the rotary agitator only circumferentially slide upwardly and downwardly along the inside of the rotary agitator. Moreover, upon completion of the mixing and coloring operation, it is necessary to clean the inside of the rotary agitator, especially to clean the coloring agents therefrom. The cleaning of the inside of the rotary agitator takes much time and labor.

SUMMARY OF THE INVENTION

Accordingly, an object of this invention is to provide an agitation apparatus for agitating pellets of synthetic resin, enabling the pellets to be colored uniformly in a short period of time by agitating the pellets and coloring agents together in an agitation vessel, enabling ready observation of the mixing/coloring conditions of the pellets from the outside of the agitation apparatus, and enabling the agitation vessel to be cleaned simply and easily.

The agitation apparatus for pellets of synthetic resins in accordance with this invention comprises a cylindrical agitation vessel housed removably within a supporting frame for receiving pellets of synthetic resins and coloring agents and an agitator mounted movably upwardly and downwardly to the supporting frame to be entered into and withdrawn from the vessel. The agitator is provided with a plurality of agitating legs having respective agitating blades on lower ends thereof. The vessel is provided in its bottom center with an upright guiding pillar with at least one stationary blade and on its inner circumferential wall with a plurality of mixing blades.

BRIEF DESCRIPTION OF THE DRAWINGS

FIG. 1 is a front view of the agitation apparatus in accordance with this invention, partially in section and showing an agitator in a descended position.

FIG. 2 is a front view of the agitation apparatus in accordance with this invention, also partially in section and showing the agitator in an elevated position.

FIG. 3 is a plan view of the agitation apparatus in accordance with this invention.

FIG. 4 is a perspective view showing the inside of an agitation vessel in accordance with this invention.

FIG. 5 is a sectional view along a line 5–5 of FIG. 4.

DETAILED DESCRIPTION OF THE PREFERRED EMBODIMENTS

An agitation apparatus for pellets of synthetic resin in accordance with this invention will be explained in detail with reference to the embodiment shown in the accompanying drawings.

In FIGS. 1–3, the agitation apparatus of this invention has a supporting frame 1 assembled approximately in a rectangular shape with longitudinal frames 4 at four corners, side frame 5 of front and rear sides, and lateral frames 6 of right and left sides. Between upper and lower lateral frames 6 disposed on both sides of the supporting frame, is fixed an elevator 8 including a guiding bar 7 to move upwardly and downwardly therein. The elevator 8 is provided at the upper end of the guiding bar 7 with an elevating carrier 9 to which an agitator 3 is mounted. The elevator 8 is constituted of cylinders of air or hydraulic pressure. Air or hydraulic pressure is introduced into or withdrawn from the cylinder, thereby causing the guiding bar 7 and the elevating carrier 9 to move together upwardly and downwardly.

An agitation vessel 2 is removably housed in the inside of the supporting frame 1, and comprises a cylindrical vessel in which pellets of synthetic resin and coloring gents are poured. The agitation vessel 2 is provided at the center of bottom 10 thereof with an upright guiding pillar 11 to which a stationary blade 12 is secured. Stationary blade 12 protrudes perpendicularly from a portion of a tangent of the circumference of the upright guiding pillar 11 so as to stop temporarily the movement of pellets of raw materials. Furthermore, in the agitation vessel 2, there is formed a plurality of mixing blades 14 which are projected inwardly from cylindrical inner circumferential wall surface 13 at a predetermined distance to each other alternately from upper and lower positions of wall surface 12.

An agitator 3 is mounted to the center portion of the elevating carrier 9 fixed to the guiding bars 7 of the elevators 8. Agitator 3 has an electric motor 5 disposed on the upper part of the elevating carrier 9 and a rotating shaft 16 protruded to the lower part of the carrier 9. The agitator 3 is provided with a plurality of agitating legs 17 mounted to the lower and of the rotating shaft 16 and with agitating pawls 18 secured to the lower ends of respective of the agitating legs 17. Each agitating leg 17 comprises a horizontal portion extending from the lower end of the rotating shaft 16 parallel to the side from 5 and the lateral frame 6 of the supporting frame 1 and a vertical portion extending parallel to the longitudinal frame 4 and extending perpendicular to the side frame 5 and lateral frame 6. The agitating pawls 18 are inclined inwardly toward an axis of the rotating shaft 16 to achieve favorable mixing of pellets. The agitator 3 can be moved by downward and upward movements of the elevating carrier 9 between two positions including the descended position shown in Fig. 1, which is the agitating and mixing operation position where the agitating legs 17 and agitating pawls 18 are inserted into the agitation vessel 2 housed within the supporting frame 1, and the elevated position shown in FIG. 2, which is out of the agitating and mixing operation position where the agitating pawls 18 are located above the agitation vessel 2.

During agitating, mixing and coloring pellets in the agitation apparatus according to this invention, the raw material pellets of synthetic resins are supplied from a storing tank to the agitation vessel 2 together with the given coloring agents. The agitation vessel 2 is settled into the supporting frame 1 at the position shown in FIG. 2 where the agitator 3 is elevated to the utmost position within the supporting frame 1. Then, by depressurizing the air or hydraulic pressure from the cylinders of the elevators 8, the elevating carrier 9 is descended and the agitating legs 17 and pawls 18 of the agitator 3 are inserted into the agitation vessel 2 which is housed in the supporting frame 1. Thereby the agitator 3 is moved into the descended position shown in FIG. 1. The agitating legs 17 and pawls 18 are rotated by means of the electric motor 15 and the pellets are agitated, mixed and colored. During agitation of the pellets with the agitating pawls 18, the pellets and coloring agents move in the same direction within the vessel 2. However the movement of the pellets will be disturbed temporarily by the mixing blades 14 mounted on the inner peripheral wall surface 13 of the vessel 2 and the stationary blade 12 mounted on the upright guiding member 11. Thereby, such movement in the same direction will be changed to produce a turburance for coloring uniformly the pellets overall and it is possible to achieve a much better efficiency of coloring of the pellets. Upon completion of mixing and coloring the pellets, the electric motor is stopped. Then by pressurizing the air or hydraulic pressure to the cylinders of the elevators 8, the agitation 3 and the agitating pawls 18 are moved to the elevated position shown in FIG. 2, and the agitator vessel 2 is taken out from the supporting frame 1 for supply to a transfer apparatus.

What is claimed is:

1. An agitation apparatus for agitating pellets of synthetic resin, said apparatus comprising:

a supporting frame;

a cylindrical vessel removably housed in said supporting frame and to receive pellets to be agitated;

an agitator mounted on said supporting frame for movement upwardly and downwardly relative thereto, said agitator having agitating means to be entered into and withdrawn from said vessel upon downward and upward movement, respectively, of said agitator;

an upright guiding pillar positioned in a center of a bottom of said vessel;

a stationary blade extending from said pillar in a direction toward an inner peripheral surface of said vessel; and a plurality of mixing blades extending from said inner peripheral surface in a direction toward said pillar, said mixing blades being spaced from each other.

2. An apparatus as claimed in claim 1, wherein said plurality of mixing blades are arranged in a circumferential direction of said vessel to protrude alternately from an upper portion and a lower portion of said inner peripheral surface.

3. An apparatus as claimed in claim 11, wherein said stationary blade is secured to said pillar.

4. An apparatus as claimed in claim 1, wherein said mixing blades are secured to said inner peripheral surface.

5. An apparatus as claimed in claim 1, wherein said supporting frame includes at least one elevator having an upwardly and downwardly movable guide bar, and further comprising an elevating carrier connected to said guide bar and supporting said agitator.

6. An apparatus as claimed in claim 5, wherein said agitator includes an electric motor disposed on an upper portion of said elevating carrier, a rotating shaft extending downwardly from said motor, a plurality of agitating legs mounted on a lower end of said shaft, and agitation pawls secured to lower ends of said agitating legs.

* * * * *